United States Patent Office 3,395,926
Patented Aug. 6, 1968

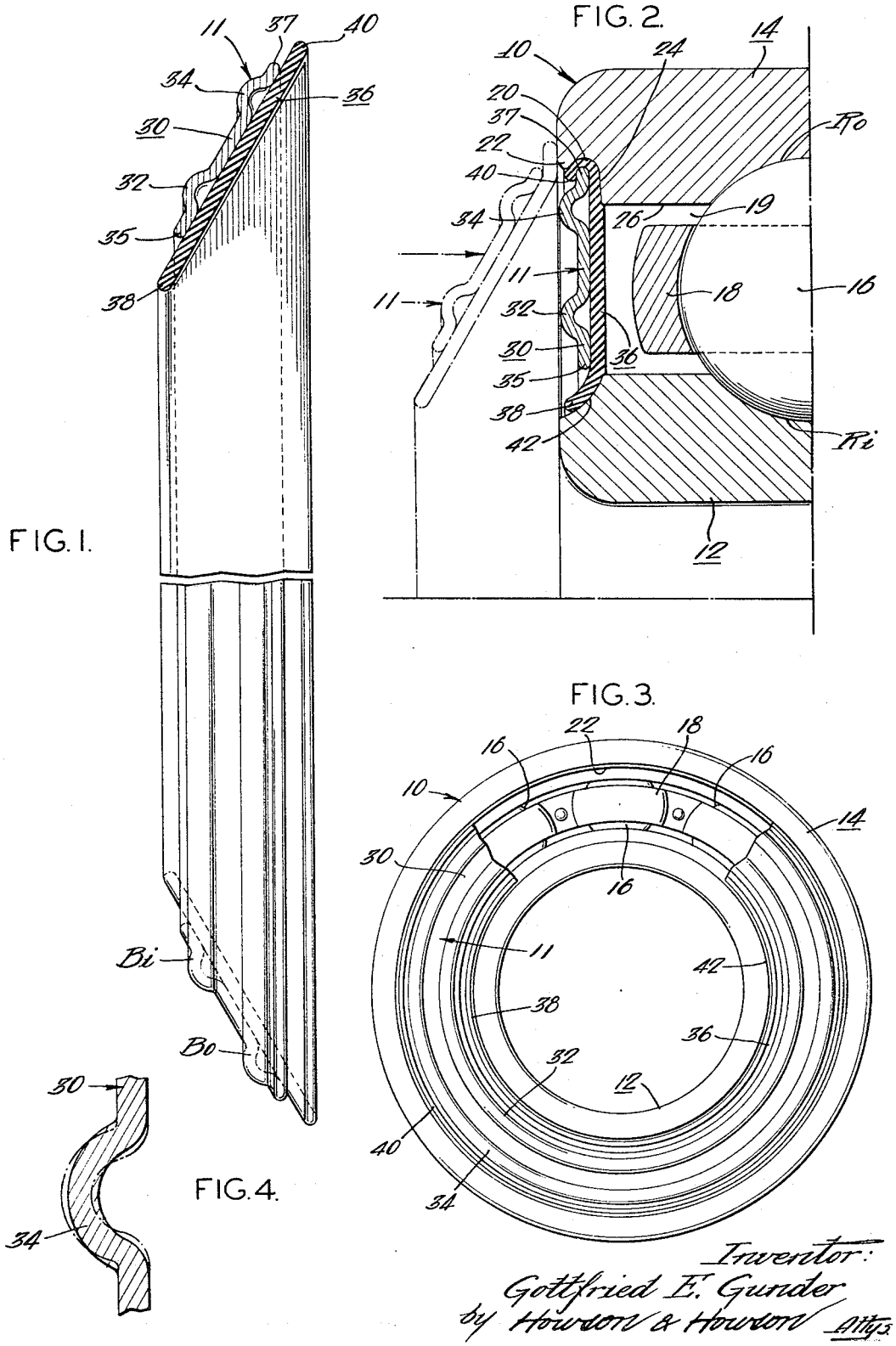

3,395,926
SEAL FOR BEARING
Gottfried E. Gunder, Sparks, Md., assignor to SKF Industries, Inc., King of Prussia, Pa., a corporation of Delaware
Filed June 28, 1965, Ser. No. 467,625
1 Claim. (Cl. 277—235)

ABSTRACT OF THE DISCLOSURE

A seal for sealing the space between confronting surfaces of a pair of relatively rotatable members such as the inner and outer rings of a bearing assembly, comprising an imperforate frusto-conical reinforcing member made of a friable material and a frusto-conical sealing element made of rubber adhered to the inner face of the reinforcing member having lip portions extending beyond the inner and outer peripheral edges of the reinforcing member. The seal is adapted to seat in an annular groove in the outer ring by positioning the seal assembly adjacent the opening defined by the outer edge of the groove and then applying an axial force to the reinforcing member to snap the seal in place simultaneously deforming the friable material of the reinforcing member so that it extends radially in the opening between the rings. In order to facilitate deformation of the reinforcing member, a pair of circumferentially extending, radially spaced projecting beads are provided in the face thereof which, as illustrated in FIG. 4, take up the bulk of the deformation of the reinforcing member when it is assembled in place. Further, the beads face outwardly and the outer bead is so disposed to provide a clearance between the rubber sealing element and the land edge on the outer ring.

---

The present invention relates to a sealing device for sealing the interstice between spaced confronting surfaces of a pair of relatively rotatable members such as the annular space between the rings of a bearing assembly.

In these applications in the bearing art, the seal serves to prevent leakage of lubricant from the annular space between the inner and outer rings of the assembly and to preclude infiltration of dirt and foreign matter into the annular space.

Some prior bearing seals used for this purpose include a radially directed annular reinforcing member made of metal embedded in an outer member of resilient material such as rubber which has a radially inwardly directed lip adapted to engage the inner ring and has a bulbous outer peripheral edge adapted to seat in a groove in the outer ring. The groove in the outer ring is defined by an outer circumferentially extending rim and the diameter of the opening provided by the rim is smaller than the diameter of the seal so that it has to be forced into place.

Another type of prior seal comprises a pair of annular reinforcing members and a resilient sealing element made of rubber sandwiched between the reinforcing members. One of the reinforcing members has a turned over flange holding the assembly together. This seal is staked to the outer ring by upsetting or peening the reinforcing members at a plurality of circumferentially spaced locations. Between the staked points the bulb of the seal plate is flattened to contact the recessed groove.

These prior seals have not been entirely satisfactory in providing an effective seal for the bearing assembly. One of the problems with the prior type of seal, especially the so-called "stake seal," is that during assembly the forces required to seat the seal distort the outer ring. This distortion of the outer ring can affect the dimensional stability especially if the outer ring is mounted in a housing where the fit of the ring in the housing is critical. Furthermore distortion of the outer ring may adversely affect raceway characteristics such as waviness and the vibration characteristics of the bearing assembly. Furthermore, it has been found that these prior seals do not provide a uniform sealing action around the outer ring and that in some cases leakage results. Elimination of leakage at the outer ring is, of course, of prime importance in outer ring rotation bearing applications.

The prior seals discussed above are comparatively expensive to make and are relatively difficult to assemble. Furthermore, these seals are difficult to disassemble from the bearing assembly without damaging either the seal or the rings of the bearing assembly.

In accordance with the present invention, there is provided an improved seal for rolling bearing assemblies which overcomes the above noted difficulties of prior type seals. The seal of the present invention comprises an annular reinforcing member which is frusto-conical in shape prior to installation and which is made of a friable material, such as a very mild steel and a frusto-conical annular sealing element secured to one face of the reinforcing member which extends beyond the inner and outer peripheral edges of the reinforcing member. The reinforcing member is provided with a least one circumferentially extending, outwardly projecting ridge or rib in one face thereof. In the present instance, the reinforcing member is provided with a pair of outwardly displaced ridges adjacent its inner and outer peripheral edges forming, in effect, a corrugated construction. The outer diameter of the reinforcing member prior to installation is slightly smaller than the diameter of the opening defined by the rim of the outer ring. By this arrangement when installing the seal, the seal may be placed over the open axial end of the annular space between the rings of the bearing assembly. An assembly unit then engages the seal to snap the seal under the lip of the groove and seat the seal in the groove of the outer ring. In this position the outer radially projecting lip of the resilient member overlaps the outer peripheral edge of the reinforcing member and seats in the groove in the outer ring. Now by applying an axial pressure against the reinforcing member, the friable reinforcing member is plastically deformed to a radial configuration as illustrated in FIG. 2 of the drawings, thereby firmly seating in the annular groove in the outer ring. In this position, the inner terminal edge of the resilient member engages the inner ring to provide a seal at that juncture.

The seal of the present invention in addition to being very economical to make, is relatively easy to install and provides an effective seal when installed in the bearing assembly. The particular arrangement provides a uniform seal around the periphery of the outer ring by reason of the friable readily deformable nature of the reinforcing member. Installation of the seal does not affect the dimensional stability of the outer ring and further does not adversely affect raceway characteristics as with prior seals discussed above. Moreover, the seal of the present invention is much more economical to make than the prior seals.

With the foregoing in mind an object of the present invention is to provide a new and improved seal for a bearing assembly which effectively seals the annular space between the inner and outer rings and which is characterized by novel features of construction and arrangement whereby the seal is easy to install and disassemble without adversely affecting characteristics of the bearing assembly.

Another object of the present invention is to provide an improved seal for bearings which is of comparatively simplified construction and may be manufactured easily and economically.

A further object of the present invention is to provide a seal for bearings which by reason of its construction has an extremely high blow-in resistance.

These and other objects of the present invention and the various features and details of the construction and use thereof are more fully set forth hereinafter with reference to the accompanying drawing, in which:

FIG. 1 is a side elevational view partly in section of a seal construction in accordance with the present invention;

FIG. 2 is a transverse fragmentary sectional view of a bearing assembly showing a seal in accordance with the present invention prior to installation and also installed;

FIG. 3 is an end view of a bearing assembly incorporating the seal of the present invention; and FIG. 4 is an enlarged fragmentary sectional view showing a portion of the reinforcing member of the seal of the present invention.

Referring now to the drawing, there is shown in FIG. 2 a bearing assembly 10 comprising radially spaced, inner and outer rings 12 and 14 respectively having the usual raceways $R_i$ and $R_o$ therein to support and guide a plurality of rolling elements, in the present instance balls 16. The bearing assembly further includes a cage 18 of conventional form for guiding and circumferentially spacing the balls in the annular space 19 between the rings. FIG. 2 shows only one side of the bearing assembly, the opposite side thereof being an image of the shown side.

Adjacent each axial end of the outer ring 14, there is provided an annular locking groove 20 which is disposed between a radially inwardly projecting rim 22 and a radially extending shoulder or land 24 which projects radially inwardly beyond the opening provided by the rim as illustrated. In the present instance, the diameter of the opening provided by the rim 22 is smaller than the diameter of the groove 20 and greater than the inner peripheral wall 26 of the outer ring.

In accordance with the present invention a seal is provided which is adapted to be secured to a bearing assembly at either or both axial ends of the annular space 19 and which has novel features of construction and arrangement providing a seal which is economical, easy to install and is an effective seal between the rings to retain lubricant in the bearing and prevent infiltration of dust and foreign matter into the annular space. To this end the seal 11 comprises an annular reinforcing member 30 which, as best illustrated, is fructo-conical and which is made of a friable material which may be plastically deformed, for example, a very mild steel. In the present instance, the reinforcing member 30 has a pair of circumferentially extending inner and outer offset or displaced portions 32 and 34 adjacent the inner and outer peripheral edges 35 and 37 respectively thereof, the offset or displaced portions being outwardly directed and forming inner and outer annular outwardly projecting beads or ridges $B_i$ and $B_o$. Thus, the reinforcing member presents a corrugated appearance in cross section. The seal further includes an annular frusto-conical resilient member 36 made of a resilient material such as rubber which is bonded to the inner face of the reinforcing member 30. The annular sealing member 36 projects outwardly beyond the inner and outer peripheral edges 35 and 37 of the reinforcing member 30 to define inner and outer circumferentially extending, flexible lips 38 and 40.

The seal is assembled to the bearing assembly by placing it over the annular recess between the rings whereby, as illustrated in FIG. 2, the outer lip 40 abuts the front face of the annular rim 22 of the outer ring 14. Now by applying a slight axial pressure against the seal, the lip 40 laps over the outer peripheral edge 37 of the reinforcing member 30 and seats in the annular groove 20. It is noted that the diameter of the reinforcing member 30 at its outer edge 37 is slightly smaller than the diameter of the opening provided by the annular rim 22 to facilitate easy positioning of the seal over the annular space. Thereafter, a suitable tool is used to apply a force to approximately the center of the reinforcing member 30 in an axial direction as indicated by the arrow in FIG. 2 whereby the friable material of the reinforcing member is plastically deformed until it assumes a radial shape as shown in FIG. 2.

It is noted that during this operation, the outer peripheral edge 37 of the reinforcing member 30 is expanded outwardly slightly to firmly press the outer lip 40 of the resilient member in the annular groove 20 and provide a uniform effective seal around the entire outer ring. It is noted further, that in this position the inner lip 38 of the resilient member presses against an arcuate circumferentially extending surface 42 on the inner ring to provide a seal at this juncture. As best illustrated in FIG. 4, some of the axial compression of the reinforcing member 30 is taken up by the annular beads $B_i$ and $B_o$. In the assembled relation, the annular bulge or bead $B_o$ lies adjacent the land 24 on the outer ring so that the material of the resilient member 36 does not wear at the juncture of the land 24 and the inner surface 26 of the outer ring.

From the foregoing it is readily apparent that the seal of the present invention is of comparatively simplified construction so that it is very economical to make. The seal assembly simply consists of a frusto-conical shaped disc or annular member 30 and a frusto-conical shaped resilient member 36 which is merely adhered to the inner face of the disc by a suitable adhesive. This is a much cheaper construction as compared with the integrally molded type seal discussed above.

Further, by having the outer lip 40 of the resilient member 36 free and not bonded to the reinforcing member 30, the resilient member more readily conforms to any surface irregularities in the groove 20 of the outer ring and provides a much more effective seal. Further, as described above, no great force is required to install the seal in the annular groove and thus the dimensional stability of the outer ring is maintained and in this matter no harmful forces are set up to adversely affect raceway characteristics, such as waviness or vibration. Furthermore, since the reinforcing member is made of a friable material such as a mild steel, and by reason of the fact that the annular beads $B_i$ and $B_o$ take up some of the axial compression of the reinforcing member when it is plastically deformed from a frusto-conical shape to a substantially radial form, there is no danger of damage to the outer ring.

While a particular embodiment of the present invention has been illustrated and described herein, it is not intended to limit the invention and changes and modifications may be made therein within the scope of the following claim.

I claim:

1. For a bearing assembly having radially spaced inner and outer bearing rings defining an annular space therebetween wherein the outer ring is provided at one axial end with a radially extending annular sealing land terminating in an inwardly facing continuous groove defined by an inwardly projecting continuous rim and the inner ring is provided at the corresponding axial end with an annular sealing surface; a sealing member for enclosing the annular space between the bearing rings in sealing engagement therewith, comprising a plastically deformable imperforate reinforcing member made of a mild steel of initially frusto-conical configuration having a diameter less than the diameter of the opening defined by the rim of the outer bearing ring, a pair of concentric continuous annular ribs formed in said imperforate reinforcing member adjacent the inner and outer peripheral edges thereof, said ribs projecting from the external surface of said reinforcing member and providing continuous grooves in the internal surface of said member, a resilient sealing element of frustoconical configuration conforming to said reinforcing member secured to the internal surface thereof, said resilient sealing element being of greater width than said reinforcing member and the outer and inner peripheral edge portions of said sealing element projecting respectively beyond the outer and inner peripheral edges of said reinforcing member a predetermined distance so that when the sealing member is positioned in closing relation to the space between the bearing rings and deformed from said initial frusto-conical configuration to a radial configuration the peripheral surface portions of the resilient sealing element are disposed in sealing engagement with the sealing land and annular sealing surface respectively of the outer and inner bearing rings and the outer peripheral lip portion of said sealing element is disposed in circumscribing relation about the outer edge of the reinforcing member and engaged thereby firmly in the groove defined by the rim on said outer bearing ring.

References Cited

UNITED STATES PATENTS

| | | | |
|---|---|---|---|
| 2,221,554 | 11/1940 | Okun | 277—94 X |
| 2,712,460 | 7/1955 | Saywell | 277—94 |
| 3,241,846 | 3/1966 | Peickii | 277—235 |

FOREIGN PATENTS

| | | |
|---|---|---|
| 622,418 | 5/1949 | Great Britain. |
| 704,620 | 3/1965 | Canada. |

SAMUEL ROTHBERG, *Primary Examiner.*